US012731452B2

(12) United States Patent
Witty et al.

(10) Patent No.: US 12,731,452 B2
(45) Date of Patent: Sep. 8, 2026

(54) ACCESS CONTROL SYSTEM

(71) Applicant: Accessia Technology Ltd, Uxbridge (GB)

(72) Inventors: Paul Richard Witty, Virginia Water (GB); Nikola Ilkov Bozhinov, Uxbridge (GB)

(73) Assignee: Accessia Technology Ltd, Uxbridge (GB)

( * ) Notice: Subject to any disclaimer, the term of this patent is extended or adjusted under 35 U.S.C. 154(b) by 110 days.

(21) Appl. No.: 18/989,292

(22) Filed: Dec. 20, 2024

(65) Prior Publication Data

US 2025/0209876 A1 Jun. 26, 2025

(30) Foreign Application Priority Data

Dec. 22, 2023 (GB) ...................................... 2320009

(51) Int. Cl.
*G07C 9/27* (2020.01)

(52) U.S. Cl.
CPC ...................................... *G07C 9/27* (2020.01)

(58) Field of Classification Search
CPC .. G07C 9/27; G07C 9/00817; G07C 9/00309; G07C 9/00571; G07C 9/00904; G07C 2009/00825; G07C 2209/04; G07C 9/20
See application file for complete search history.

(56) References Cited

U.S. PATENT DOCUMENTS

2021/0142601 A1* 5/2021 Schoenfelder ......... G05B 15/02
2022/0058903 A1* 2/2022 Johnson ............. G07C 9/00309
2023/0072114 A1* 3/2023 Larsson ................ H04W 12/08

FOREIGN PATENT DOCUMENTS

CN 116631100 A 8/2023

OTHER PUBLICATIONS

Search Report issued Sep. 5, 2024, in connection with GB Patent Application No. 2320009.0, from the UK Intellectual Property Office.

* cited by examiner

*Primary Examiner* — Omeed Alizada
(74) *Attorney, Agent, or Firm* — Godfrey & Kahn, S.C.; Christopher M. Scherer

(57) ABSTRACT

An access control system for controlling access to restricted physical areas, the access control system comprising: a first access control apparatus for controlling access to a first restricted physical area, the first access control apparatus comprising a first data store storing a first list of access tokens by which the first restricted physical area can be accessed; and a second access control apparatus for controlling access to a second restricted physical area, the second access control apparatus comprising a second data store storing a second list of access tokens by which the second restricted physical area can be accessed and a third list of access tokens by which it is desired that the first restricted physical area can be accessed; the second access control apparatus being responsive to an indication from the first access control apparatus of a location of a third data store to write the third list to the third data store; and the first access control apparatus being operative to: (i) receive the third list from the third data store; and (ii) in response to the presentation to the first access control apparatus of an access token, determine whether that access token is listed in the first list or the third list, and permit or deny access to the first restricted physical area in response to that determination.

20 Claims, 7 Drawing Sheets

ACCESS CONTROL SYSTEM

CROSS-REFERENCE TO RELATED APPLICATIONS

The present application claims priority from British Patent Application No. 2320009.0 filed Dec. 22, 2023, the contents of which are incorporated herein by reference in its entirety.

FIELD OF THE INVENTION

This invention relates to control systems for physical security systems, in particular to access control systems.

BACKGROUND

Security systems are often installed in buildings, such as offices, hospitals and universities. Many physical security systems with access points such as doors having an electrically operated security locks use a key device such as a card, badge or fob to allow authorized users entry to restricted areas. From the information stored at the key, the system determines whether the user is authorized to enter the restricted area. If they are, the access point can be unlocked.

Large buildings often include multiple restricted areas. Access control apparatus for each of those areas may be independently administered. For example, it is common to have a communal main entrance or reception area in a building occupied by multiple organisations. The personnel requiring access to the respective restricted areas within the building will also need access to the communal areas in order to access the individual restricted areas.

For example, tenants renting office space in a shared building may control access restrictions for their own office spaces. However, the tenants will also need access to the building via the main entrance to allow them to access the office space.

In this case, tenants may be able to easily authorise access to new users via their own access control system. However, they will also need to communicate new users to be given access to the main entrance of the building to the administrator of the building access control system. This can be time consuming and inconvenient for both parties. This may also require users to carry multiple key devices for access to the main building and the tenanted area within the building, which can be inconvenient for the user.

It is desirable to develop an improved access control system that can overcome at least some of the above issues.

SUMMARY OF THE INVENTION

According to one aspect, there is provided an access control system for controlling access to restricted physical areas, the access control system comprising: a first access control apparatus for controlling access to a first restricted physical area, the first access control apparatus comprising a first data store storing a first list of access tokens by which the first restricted physical area can be accessed; and a second access control apparatus for controlling access to a second restricted physical area, the second access control apparatus comprising a second data store storing a second list of access tokens by which the second restricted physical area can be accessed and a third list of access tokens by which it is desired that the first restricted physical area can be accessed; the second access control apparatus being responsive to an indication from the first access control apparatus of a location of a third data store to write the third list to the third data store; and the first access control apparatus being operative to: (i) receive the third list from the third data store; and (ii) in response to the presentation to the first access control apparatus of an access token, determine whether that access token is listed in the first list or the third list, and permit or deny access to the first restricted physical area in response to that determination.

If the token presented to the first access control apparatus is listed in the first list or the third list, the first access control apparatus may permit access to the first restricted physical area. If the token presented to the first access control apparatus is not listed in the first list or the third list, the first access control apparatus may deny access to the first restricted physical area.

The first access control apparatus may inform the second access control apparatus of the location of the third data store where the second access control apparatus can write a list of users who are permitted to enter the first physical area. The first access control apparatus may grant the second access control apparatus a permission to modify this list at the third data store. The second access control apparatus may update a list at the third data store with the list of users permitted in the third list.

An access control reader of the first access control apparatus may access the updated list from the third data store to grant access to the first restricted area to the access tokens in the third list, for example when a device storing that token is presented to the access control reader at a respective access point. The first access control apparatus may be notified that this list at the third data store has been modified, which then notifies the reader or control unit of the first access control apparatus, and the reader or control unit may then fetch the updated list from the third data store. When a user presents their access token to the reader for an access point controlled by the first access control apparatus, the user is granted access if their access token is in the first list or the third list.

The second list may be different to the third list. The tokens listed in the third list may be a sub-set or a super-set of the access tokens in the second list. The second list and the third list may have at least some common access tokens. The third list stored at the second data store may be a list of tokens for future access to the first restricted physical area. The third list stored at the second data store may be a list of tokens to be given access to the first restricted physical area. The tokens in the third list may be given access to the first restricted physical area when the first access control apparatus receives the third list. The third list may be different to the first list. The third list and the first list may have no common access tokens.

The first list may be a local list stored by the first access control apparatus. The second list may be a local list stored by the second access control apparatus.

The location of the third data store may be a remote location. The location may be at a different location to the first data store and the second data store. The location may be remote from the first data store and the second data store. The location may be accessible by the first access control apparatus and the second access control apparatus. The location may be at a cloud service. In other examples, the location may be a location in a hardware memory. In one case, the third data store may be part of the first data store. For example, the third data store may be at a location within the first data store.

The first access control apparatus may be configured to, in response to an indication from the third data store that the list at the third data store has been updated by the second access control apparatus, receive the updated list from the third data store. If the token presented to the first access control apparatus is listed in the first list or the third list, the first access control apparatus may permit access to the first restricted physical area. If the token presented to the first access control apparatus is not listed in the first list or the third list, the first access control apparatus may deny access to the first restricted physical area.

Each access token of the first list and third list of access tokens may correspond to a respective user, each respective user being authorized to access the first restricted physical area. Each access token of the second list of access tokens corresponds to a respective user, each respective user being authorized to access the second restricted physical area.

Access to the first restricted physical area may be granted via one or more first access points and access to the second restricted physical area may be granted via one or more second access points. The first access control apparatus may control the one or more first access points. The second access control apparatus may control the one or more second access points.

The one or more first access points and/or the one or more second access points may be security doors, barriers or turnstiles.

The first access control apparatus may comprise a respective first control unit at the or each first access point and/or the second access control apparatus may comprise a respective second control unit at the or each second access point. The first access control apparatus may comprise a respective first access control reader at the or each first access point and/or the second access control apparatus may comprise a respective second access control reader at the or each second access point.

The first access control apparatus may be operable to allow access to the first restricted physical area via a respective first access point when a device storing an access token in the first list or the third list is presented to an access control reader of the respective first access point. The access control reader may be part of the control unit at the respective first access point or may be communicatively connected with the control unit.

The device may be configurable by an operator of the first access control apparatus or the second access control apparatus to store that access token.

The first access control apparatus and the second access control apparatus may be configured to allow access to the first restricted physical area and the second restricted physical area in response to the same access token.

The third list may include data indicating time restrictions for access to the first restricted physical area by each access token in the third list.

The data indicating the time restrictions for tokens present in the third list may be configurable by an operator of the second access control apparatus. The data indicating the time restrictions for tokens present in the third list may be configurable by an operator of the first access control apparatus.

The second data store may store multiple third lists of access tokens by which it is desired that the first restricted physical area can be accessed, each respective third list comprising a different list of access tokens. Each third list may be associated with data indicating time restrictions for tokens present in that respective third list. For example, a first third list may be associated with data indicating that the tokens in the first third list will be given 24/7 access to the first restricted physical area. A second third list may be associated with data indicating that the tokens in the second third list will be given 09:00-17:00 access to the first restricted physical area. The data indicating the timing restrictions may be configurable by an operator of the first access control apparatus or the second access control apparatus. For example, the data indicating the timing restrictions may be configurable by an operator of the first access control apparatus and the first access control apparatus may indicate the data indicating the timing restrictions associated with each of the third lists to the second access control apparatus when it sends the indication of the location of the third data store to the second access control apparatus. Alternatively, the operator of the second access control apparatus may select timing restrictions for each of the third lists when choosing which access tokens are in each third list.

One of the first restricted physical area and the second restricted physical area may be a sub-region of the other of the first restricted physical area and the second restricted physical area.

The first access control apparatus and the second access control apparatus may be administered independently.

The first restricted physical area and the second restricted physical area may be located in the same building.

One of the first restricted physical and the second restricted physical area may be located within the perimeter of the other of the first restricted physical area and the second restricted physical area.

The first restricted physical area and the second restricted physical area may be remote from each other.

The first restricted physical area and the second restricted physical area may be located in separate buildings.

According to another aspect, there is provided a method for implementation at an access control system, the access control system comprising a first access control apparatus for controlling access to a first restricted physical area, the first access control apparatus comprising a first data store storing a first list of access tokens by which the first restricted physical area can be accessed; and a second access control apparatus for controlling access to a second restricted physical area, the second access control apparatus comprising a second data store storing a second list of access tokens by which the second restricted physical area can be accessed and a third list of access tokens by which it is desired that the first restricted physical area can be accessed; the second access control apparatus being responsive to an indication from the first access control apparatus of a location of a third data store to write the third list to the third data store; the method comprising, at the first access control apparatus: (i) receiving the third list from the third data store; and (ii) in response to the presentation to the first access control apparatus of an access token, determining whether that access token is listed in the first list or the third list, and permit or deny access to the first restricted physical area in response to that determination.

According to another aspect, there is provided an access control apparatus for controlling access to a first restricted physical area, the access control apparatus comprising: a first data store storing a first list of access tokens by which the first physical area can be accessed; and one or more processors configured to:

(i) send an indication of a location of a third data store to a second access control apparatus for controlling access to a second restricted physical area, the second access control apparatus comprising a second data store storing a second list of access tokens by which the second restricted physical area can be accessed and a third list of access tokens by which it is desired that the first restricted physical area can be accessed;

(ii) in response to the second access control apparatus writing the third list to the third data store, receive the third list from the third data store; and (iii) in response to the presentation to the first access control apparatus of an access token, determine whether that access token is listed in the first list or the third list, and permit or deny access to the first physical area in response to that determination.

According to another aspect, there is provided a method for implementation at an access control apparatus for controlling access to a first restricted physical area, the access control apparatus comprising a first data store storing a first list of access tokens by which the first physical area can be accessed; wherein the method comprises:

(i) sending an indication of a location of a third data store to a second access control apparatus for controlling access to a second restricted physical area, the second access control apparatus comprising a second data store storing a second list of access tokens by which the second restricted physical area can be accessed and a third list of access tokens by which it is desired that the first restricted physical area can be accessed;

(ii) in response to the second access control apparatus writing the third list to the third data store, receiving the third list from the third data store; and (iii) in response to the presentation to the first access control apparatus of an access token, determining whether that access token is listed in the first list or the third list, and permit or deny access to the first physical area in response to that determination.

According to another aspect, there is provided an access control system for controlling access to restricted physical areas, the access control system comprising: a first access control apparatus for controlling access to a first restricted physical area, the first access control apparatus comprising a first data store storing a first list of access tokens by which the first restricted physical area can be accessed; and a second access control apparatus for controlling access to a second restricted physical area, the second access control apparatus comprising a second data store storing a second list of access tokens by which the second restricted physical area can be accessed and a third list of access tokens by which it is desired that the first restricted physical area can be accessed; the second access control apparatus being responsive to a query authenticated as being from the first access control apparatus to transmit the third list to the first access control apparatus; and the first access control apparatus being operative to: (i) maintain a remote list by transmitting a query to the second access control apparatus, receiving the third list from the second access control apparatus in response to the query, and updating the remote list in response to the received third list; and (ii) in response to the presentation to the first access control apparatus of an access token, determine whether that access token is listed in the first list or the remote list, and permit or deny access to the first restricted physical area in response to that determination.

The first list may be a first local list. The second list may be a second local list. The first access control apparatus may add the received third list to the remote list.

If the token presented to the first access control apparatus is listed in the first list or the remote list, the first access control apparatus may permit access to the first restricted physical area. If the token presented to the first access control apparatus is not listed in the first list or the remote list, the first access control apparatus may deny access to the first restricted physical area.

The second access control apparatus may be operable to accept a further access token by the steps of: (i) adding the identity of the further access token to the third list; and (ii) authenticating to the first access control apparatus and transmitting the third list to the first access control apparatus.

The tokens listed in the third list may represent a sub-set or superset of access tokens by which the second restricted physical area can be accessed that can be updated by an administrator of the second control apparatus respectively. The third list stored at the second data store may be a list of tokens for future access to the first restricted physical area. The third list stored at the second data store may be a list of tokens to be given access to the first restricted physical area. The third list may be different to the first list. The third list and the first list may have no common access tokens.

Each access token of the first list of access tokens may correspond to a respective user, each respective user being authorized to access the first restricted physical area. Each access token of the second list of access tokens may correspond to a respective user, each respective user being authorized to access the second restricted physical area. Each access token of the third list of access tokens may correspond to a respective user, each respective user being authorized to access the first restricted physical area.

The third list may not comprise information indicative of the identity of users corresponding to the respective access tokens in the respective list.

Access to the first restricted physical area may be granted via one or more first access points. Access to the second restricted physical area may be granted via one or more second access points.

The one or more first access points and/or the one or more second access points may be security doors, barriers or turnstiles. The access points may have electrically controlled locks.

Each first access point may have a control unit communicatively connected to the first access control apparatus. Each second access point may have a control unit communicatively connected to the second access control apparatus.

The first access control apparatus and the second access control apparatus may be operable to allow access to the first restricted physical area and the second restricted physical area respectively via a respective access point when a device storing an access token in the first list or the second list respectively is presented to a reader of the respective access point.

The device may be configurable by an operator of the second access control apparatus to store that access token. The device may be carried by a user authorized to access the respective area.

The first access control apparatus and the second access control apparatus may be configured to allow access to the first restricted physical area and the second restricted physical area in response to the same access token.

The remote list may be associated with data indicating time restrictions for access to the first restricted physical area by each access token in the remote list. The third list may be associated with data indicating time restrictions for access to the first restricted physical area by each access token in the third list.

The data indicating the time restrictions for tokens present in the third list received from the second access control apparatus may be configurable by an operator of the second access control apparatus. This may allow the operator to set timing restrictions for access by the tokens in the third list to the first restricted physical area.

One of the first restricted physical area and the second restricted physical area may be a sub-region of the other of the first restricted physical area and the second restricted physical area.

The first access control apparatus and the second access control apparatus may be administered independently.

The first restricted physical area and the second restricted physical area may be located in the same building.

One of the first restricted physical and the second restricted physical area may be accessed through the other of the first restricted physical area and the second restricted physical area. One of the first restricted physical and the second restricted physical area may be located within the perimeter of the other of the first restricted physical area and the second restricted physical area.

The first restricted physical area and the second restricted physical area may be remote from each other.

The first restricted physical area and the second restricted physical area may be located in separate buildings.

Access to the first restricted physical area may be granted via one or more first access points, each first access point having a control unit communicatively connected to the first access control apparatus. Access to the second restricted physical area may be granted via one or more second access points, each second access point having a control unit communicatively connected to the second access control apparatus.

Each access point may comprise a control unit. The control unit may comprise one or more processors configured to determine whether the subject is authorized to enter the restricted area in dependence on identity information corresponding to the subject.

The identity information may be determined by analysing biometric information or one or more images of the subject. The identity information may be stored at a device carried by the subject and received from the device by the control unit. The identity information may be received from the device in the form of a digital certificate over an encrypted communication channel. The device may be a fob, a badge or a user device. For example, the device may be a mobile phone.

According to another aspect, there is provided a method for implementation at an access control system, the access control system comprising a first access control apparatus for controlling access to a first restricted physical area, the first access control apparatus comprising a first data store storing a first list of access tokens by which the first restricted physical area can be accessed; and a second access control apparatus for controlling access to a second restricted physical area, the second access control apparatus comprising a second data store storing a second list of access tokens by which the second restricted physical area can be accessed and a third list of access tokens by which it is desired that the first restricted physical area can be accessed; the second access control apparatus being responsive to a query authenticated as being from the first access control apparatus to transmit the third list to the first access control apparatus; wherein the method comprises, at the first access control apparatus: (i) maintaining a remote list by transmitting a query to the second access control apparatus, receiving the third list from the second access control apparatus in response to the query, and updating the remote list in response to the received third list; and (ii) in response to the presentation to the first access control apparatus of an access token, determining whether that access token is listed in the first list or the remote list, and permit or deny access to the first restricted physical area in response to that determination.

The third list may be a sub-set of the second list. The third list may be a super-set of the second list. The third list and the second list may have one or more common elements. The second list may comprise one or more access tokens that the third list does not include.

The third list of access tokens may be a list of access tokens by which it is desired by an operator of the second access control apparatus that the first restricted physical area can be accessed.

The remote list may be stored at a location such as a remote data store, such as a cloud service.

According to another aspect, there is provided an access control apparatus for controlling access to a first restricted physical area, the access control apparatus comprising: a first data store storing a first list of access tokens by which the first physical area can be accessed and a further list of access tokens by which it is desired that a second restricted physical area can be accessed; and one or more processors configured to: (i) respond to a query authenticated as being from a predetermined second access control apparatus to transmit the further list to the second access control apparatus; (ii) maintain a remote list by transmitting a query to the second access control apparatus, receiving a list of access tokens from the second access control apparatus in response to the query, and updating the remote list in response to the received list; and (iii) in response to the presentation to the first access control apparatus of an access token, determine whether that access token is listed in the first list or the remote list, and permit or deny access to the first physical area in response to that determination.

The access control apparatus may be operable to accept a further access token by the steps of: (i) adding the identity of the further access token to the further list; and (ii) authenticating to the second access control apparatus and transmitting the further list to the second access control apparatus.

According to another aspect, there is provided a method for implementation at an access control apparatus for controlling access to a first restricted physical area, the access control apparatus comprising a first data store storing a first list of access tokens by which the first physical area can be accessed and a further list of access tokens by which it is desired that a second restricted physical area can be accessed; wherein the method comprises: (i) responding to a query authenticated as being from a predetermined second access control apparatus to transmit the further list to the second access control apparatus; (ii) maintaining a remote list by transmitting a query to the second access control apparatus, receiving a list of access tokens from the second access control apparatus in response to the query, and updating the remote list in response to the received list; and (iii) in response to the presentation to the first access control apparatus of an access token, determining whether that access token is listed in the first list or the remote list, and permit or deny access to the first physical area in response to that determination.

Access to the second restricted physical area may be controlled by the predetermined second access control apparatus.

The further list may be a sub-set of the first list. The further list may be a super-set of the first list. The further list and the first list may have one or more common elements. The first list may comprise one or more access tokens that the further list does not include. The further list stored at the first data store may be a list of tokens for future access to the second restricted physical area. The further list may be a list of tokens to be given access to the second restricted physical area. The tokens in the further list may be given access to the second restricted physical area when the second access control apparatus receives the third list.

The access point may be a physical access point of a building. The access point may comprise an electrically controlled lock. The control unit may be configured to send the signal to the electrically controlled lock. The signal may cause the lock to transition from a locked state to an unlocked state.

According to a further aspect, there is provided a computer program comprising instructions that when executed by a computer cause the computer to perform the methods above.

According to a further aspect, there is provided a computer-readable storage medium having stored thereon computer readable instructions that when executed at a computer (for example, comprising one or more processors) cause the computer to perform the methods above. The computer-readable storage medium may be a non-transitory computer-readable storage medium. The computer may be implemented as a system of interconnected devices.

BRIEF DESCRIPTION OF THE FIGURES

The present invention will now be described by way of example with reference to the accompanying drawings. In the drawings.

DETAILED DESCRIPTION

Figure 1:
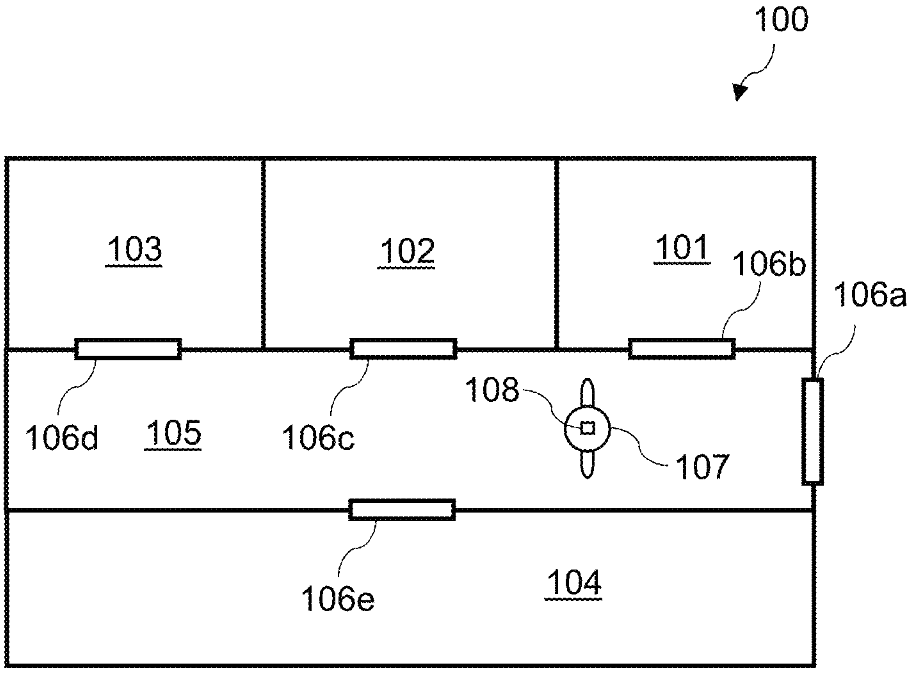
FIG. 1 schematically illustrates a building comprising multiple restricted areas, each restricted area having a controlled access point.

FIG. 1 shows an example of a building 100. The building comprises a physical security system. The building 100 comprises one or more restricted physical areas to which access is controlled. In this example, the building 100 comprises multiple rooms 101, 102, 103, 104 and a corridor 105. The rooms and corridor are each restricted areas, which may also be referred to as access-controlled areas. Access to each room, and access to the corridor from outside of the building, is provided by a physical access point, such as a door 106. In this example, each access point 106*a*, 106*b*, 106*c*, 106*d*, 106*e* has an electrically controlled lock. For example, the lock may be a magnetic lock having an electromagnet that can be selectively energized to put the access point into a locked state. To unlock the access point, the lock receives a signal to demagnetize the electromagnet, which transitions the access point from its locked state to an unlocked state.

A subject is shown inside the building at 107. In this example, the subject 107 is a human user. In other implementations, the subject may be non-human. For example, the subject may be an animal or a robot. In this example, the subject carries a device 108 storing and/or displaying information that can be used to identify the subject 107. The device 108 may be portable. The device 108 can act as a digital key or access token to the access point if the subject 107 is authorized to access the controlled area corresponding to the access point. Such devices may comprise a badge, fob, smartphone, tablet or other mobile computing device. The device may be a user device. The device 108 may comprise a power source, such as a battery.

In this example, each door 106*a-e* is associated with a control unit and an access control reader. The access control reader may be communicatively connectable to the control unit. The control unit may be separate to the reader or may be integral with it.

Figure 2:
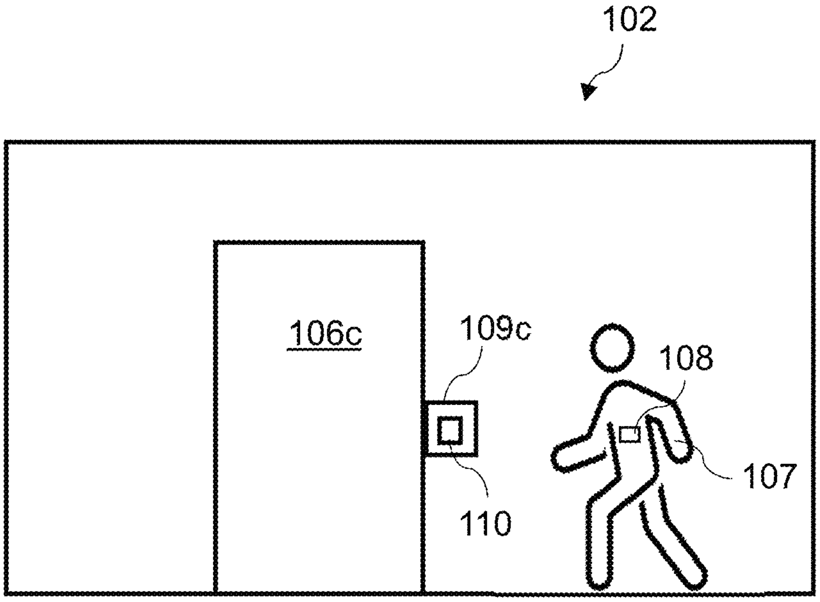
FIG. 2 schematically illustrates an example of some components of an access control system.

FIG. 2 shows an example of an access point in more detail. Door 106*c* is an access point to room 102 of FIG. 1. In FIG. 2, the subject 107 is walking down corridor 105 and is carrying the device 108, for example in a pocket of their clothing. In this example, an access control reader 109*c* is located at the access point 106*c*. The access control reader comprises a control unit 110.

Each of the doors 106*a-e* in FIG. 1 may have a respective access control reader. In some implementations, the control unit 110 may be common to all of the access points in the building, or each access point may have its own control unit for controlling access to its respective restricted area.

Control unit 110 is communicatively connectable to the device 108. The device 108 may be configured to wirelessly broadcast identity information that can be used to authenticate the subject and provide access to a restricted area if the subject is an authorized user for the access point corresponding to the restricted area. The identity information may, for example, be sent wirelessly to the reader via a radio frequency signal, such as Radio Frequency Identification (RFID) or Ultra-Wide Band (UWB) radiation. Alternatively, the user may present the device to the reader of the control unit when they wish to enter an area and the device may be read when it is in close proximity to the reader.

In other implementations, the identity information may be obtained from biometric information for the subject, for example using a fingerprint or retinal scanner. The identity information may be obtained from a machine-readable code on the subject or on the device, such as a barcode or QR code. Alternatively, facial recognition of the subject may be used. Such scanners or a camera for performing facial recognition from a captured image may be part of the access control reader, or may be otherwise communicatively connectable to the control unit. In such examples, a device 108 carrying information that can be used to identify the subject may not be used. In some implementations, identity information from one or more biometric or facial recognition identification methods may be used in addition to identity information for the subject that is stored at or displayed on the device 108 to provide an additional layer of security.

The control unit for the access point runs control logic that decides whether to allow access to the subject 107, for example by sending a signal to unlock the lock of the door.

Access to the restricted physical areas is generally governed by an access control system. The access control system may comprise two access control entities. In other examples, there may be more than two access control entities.

In one implementation, the two access control entities comprise a first access control apparatus and a second access control apparatus. Each of the access control apparatus comprises at least one processor and at least one memory. The processor may be implemented as dedicated hardware in the device, such as a processing chip. The memory is arranged to communicate with the respective processor. Memory may be a non-volatile memory. Each apparatus may comprise more than one processor and more than one memory. The memory may store data that is executable by the processor. By executing program code contained in such data, the one or more processors may perform functions as described herein. The memory may store such program code in a non-transitory manner. The processor may be configured to operate in accordance with a computer program stored in non-transitory form on a machine readable storage medium. The computer program may store instructions for causing the processor to perform its methods in the manner described herein. Each apparatus may also comprise a transceiver for receiving and/or sending data from and/or to other entities.

The first access control apparatus controls access to a first restricted area. The second access control apparatus controls access to a second restricted area. Each access control apparatus may comprise one or more control units and access control readers as described above.

In some examples, the first and second restricted areas may both be within the same building. The second area may be within the first area, or vice versa. The second area may be accessed through the first area, or vice versa. For example, the first restricted area may comprise communal access points and areas (for example, the front door and reception area of a shared building). The second area may be accessible through the first area. For example, the second area may be a tenanted area within the shared building. Generally, the first and second areas are areas which are independently administered.

Each of the first and second access control apparatus comprises a data store (which may be the memory discussed above or a separate memory) storing a respective local list of access tokens by which the respective area controlled by that apparatus can be accessed. The data store is accessible by the one or more processors of the apparatus. Herein, the first apparatus comprises a data store storing a first list of access tokens and the second apparatus comprises a data store storing a second list of access tokens. In some implementations, the data stores of each of the apparatus may also store further lists of access tokens by which it is desired that the area controlled by the other access control apparatus in the access control system can be accessed. This will be described in more detail later.

It is desirable that, for example, where the second area is a tenanted area of a building with access via the first area, the second access control apparatus can communicate with the first access control apparatus to update the list of users which are allowed access to the first restricted area.

In some implementations, one access control apparatus can respond to a query authenticated as being from a predetermined other access control apparatus to transmit a stored list to the second access control apparatus. The stored list is a list of access tokens by which it is desired, for example by an operator of that access control apparatus, that the restricted physical area controlled by the other access control apparatus can be accessed.

The first access control apparatus can maintain a remote list by transmitting a query to the second access control apparatus, receiving a list of access tokens from the second access control apparatus in response to the query, and updating the first remote list in response to the received list. The received list may comprise the list of access tokens stored at the data store of the second apparatus by which it is desired that the first restricted physical area can be accessed.

In one example in such implementations, the second access control apparatus can accept a further access token, for example corresponding to a new employee requiring access to both the first and second areas, by adding the identity of the further access token to the stored list. This may be done when an administrator of the second control apparatus inputs or selects that token to be added to the list. The second access control apparatus then authenticates to the first access control apparatus and transmits the list to the first access control apparatus. As described above, the first access control apparatus then adds the tokens in the received list to its remote list.

Then, in response to the presentation to the first access control apparatus of an access token (for example by user 107 presenting device 108 to an access control reader of an access point), the first access control apparatus can determine whether that access token is listed in the first list or the remote list, and permit or deny access to the first physical area in response to that determination.

In another words, the access control system has two (or more) access control entities. Each access control entity has a local list of access tokens that it's been instructed, for example by its own administrator, to give access to another restricted area. It also keeps a remote list up to date by querying the other entity. Each apparatus is operative to maintain its respective remote list by transmitting a query to the other access control apparatus, receiving the respective stored local list from the other access control apparatus in response to the query, and updating its own remote list in response to the received local list from other access control apparatus.

Each access control entity can then permit access to tokens that are on either its respective local list or its respective remote list.

In the examples described below, the access control system comprises a first access control apparatus for controlling access to a first restricted physical area and a second access control apparatus for controlling access to a second restricted physical area.

Figure 3:
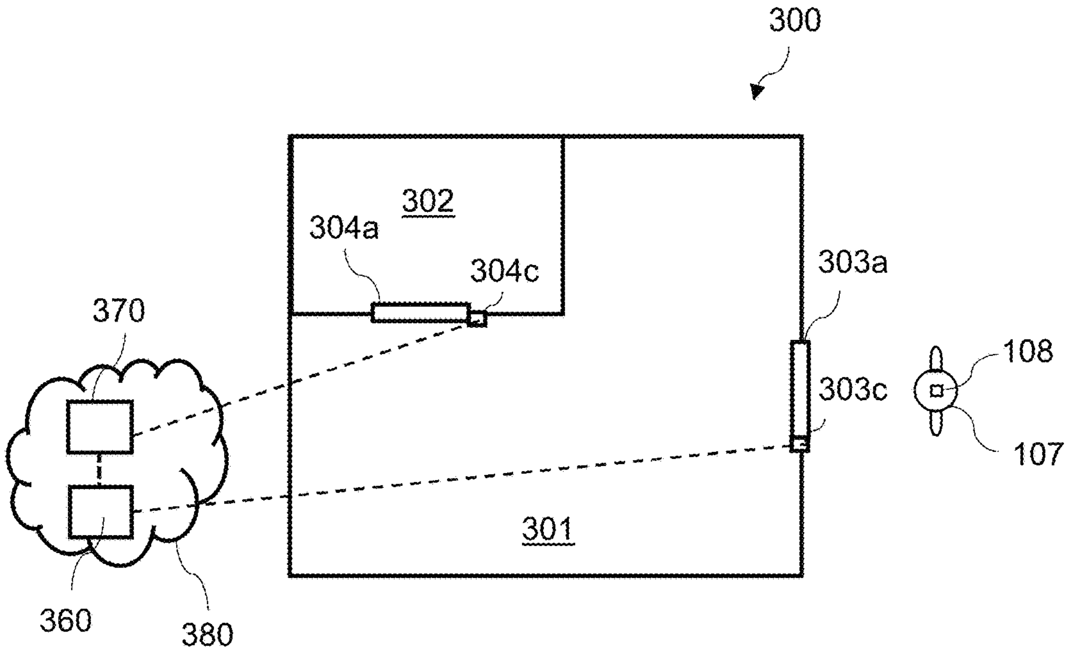
FIG. 3 schematically illustrates an access control system where a second restricted physical area is accessed through a first restricted physical area.

In one example, as shown in FIG. 3, a building 300 comprises a first area 301 and a second area 302. The second area 302 is accessed via the first area 301. The front door 303*a* to area 301 has an access control reader 303*c*. A user 107 requiring access to the second area 302 also requires access to the first area 301, and thus is authorized to enter access point 303*a*, as well as the access point 304*a* to the second area 302, which has its own access control reader 304*c*.

In this example, the first access control apparatus is a perimeter access control apparatus which authenticates to a subsidiary access control apparatus in order to obtain a list of tokens which are permitted to access the first area 301 of the building, and vice versa.

In FIG. 3, the first and second access control apparatus comprise entities 360 and 370 respectively, which in this example are entities located at a cloud service. The entities 360, 370 are processing entities and comprise one or more memories. In other implementations, the entities may be embodied by hardware comprising one or more processors and one or more memories. The entities can communicate with each other and with the respective access control readers 303*c*, 304*c* of the access points they control via a data network such as the internet 380. The connection may be wireless, as in this case, or wired. In this example, the access control readers comprise the control unit for the access point.

The entity 360 of the first access control apparatus comprises a data store storing a first local list of access tokens by which the area 301 can be accessed.

The entity 370 of the second access control apparatus comprises a data store storing a second local list of access tokens by which the area 302 can be accessed. The data store of the entity 370 of the second access control apparatus also stores a third local list of access tokens by which it is desired that the area 301 can be accessed.

The entity 370 can receive a query from the entity 360 to send its third local list to the entity 360. When it receives the query, entity 370 of the second access control apparatus can authenticate the query as being from the entity 360 of the first access control apparatus. The entity 370 then sends its third local list of tokens to the entity 360.

The entity 360 maintains a remote list of tokens by which the first area 301 can be accessed. The entity 360 updates its remote list in response to the received third local list. When updating the remote list, the entity 360 may add any tokens in the received third local list that are not already present in the remote list to the remote list. If there are one or more tokens currently in the remote list that are not on the third local list received from entity 370, the entity 360 may remove those one or more tokens from the remote list.

If user 107 presents their device 108 to the reader 303*c* of access point 303*a* (which is part of the first access control apparatus), the reader determines whether that access token is listed in the first local list or the remote list, and permits or denies access to the first restricted physical area in response to that determination. If the access token stored at the user's device 108 is listed in the first local list or the remote list, the user 107 is permitted access to the area 301 via access point 303*a*.

In this case, the user 107 is an employee of a company leasing the second area 302 of the building 300 and their access token is listed on the local list stored by the data store at entity 370. Because this local list was communicated from the entity 370 to the entity 360 and added to the remote list maintained by entity 360, the access token presented by user 107 allows access to be granted to the user because it is listed in the remote list maintained by the entity 360.

The user 107 may then proceed through area 301 to access the second area 302. The user 107 can present their device 108 to the reader 304*c* of access point 304*c* (which is part of the second access control apparatus). The reader 304*c* then determines whether that access token is listed on the local list stored by entity 370 or on the remote list maintained by entity 370. Because that access token is on the local list for entity 370, access to the user is permitted to the area 302 via access point 304*a*.

Figure 4:
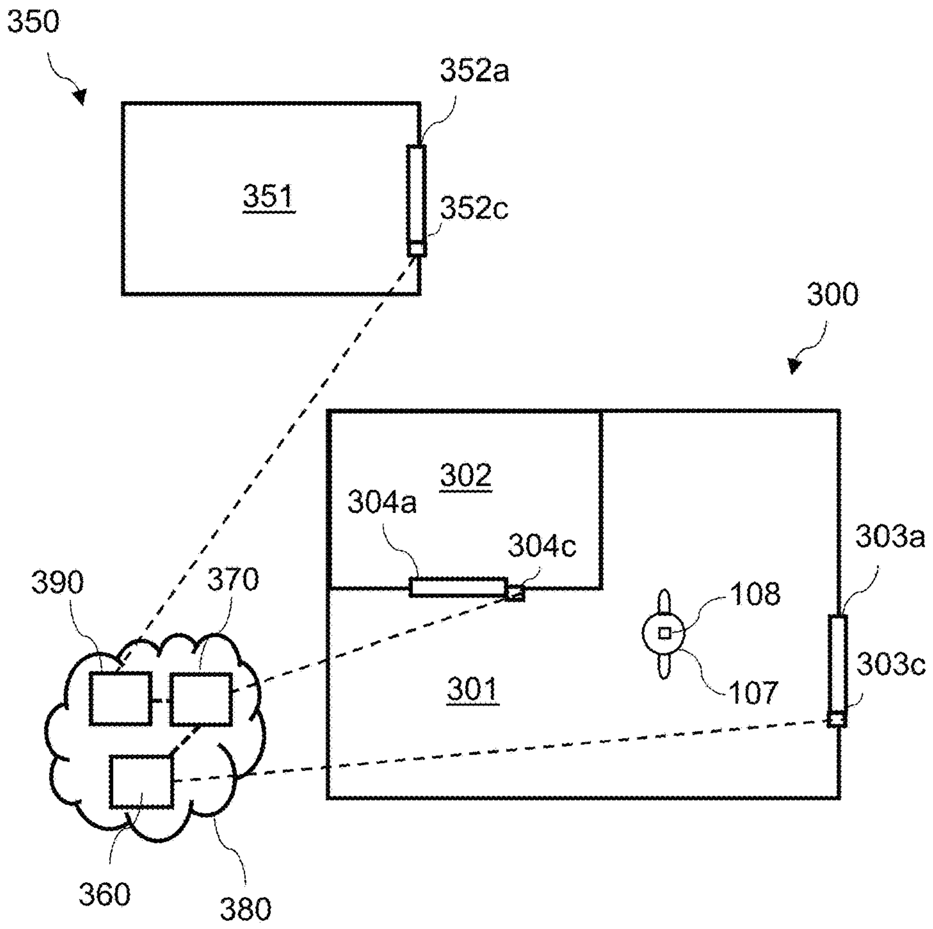
FIG. 4 schematically illustrates an access control system where first and second restricted physical areas are remote to each other.

A large company might own or be a tenant in multiple buildings, and so the access control system may alternatively or additionally communicate with a further access control apparatus comprising entity 390, as shown in FIG. 4.

In this example, the further access control apparatus comprising entity 390 controls access to the restricted area 351 in a separate building 350. The entity 390 comprises a data store storing a local list of access tokens by which the area 351 can be accessed and a further local list by which it is desired that the area 301 be accessed. Access to area 351 is via access point 352*a* having an accesso control reader 352*c* that is communicatively connected with entity 390.

In this case, the entity 370 and the entity 390 can communicate with each other to exchange their respective local lists of tokens to be given access to the other restricted area. The entity 390 can also send its local list to the entities 360 and 370 so that users authorized to access area 351 (i.e. users with tokens on the local list stored at entity 390) can have access to the communal area 301 and the area 302 as desired.

As mentioned above, the first access control apparatus and the second access control apparatus are operable to allow access to the first restricted physical area and the second restricted physical area respectively via a respective access point when a device storing an access token in the first local list or the second local list respectively is presented to a reader of the respective access point.

Figure 5:
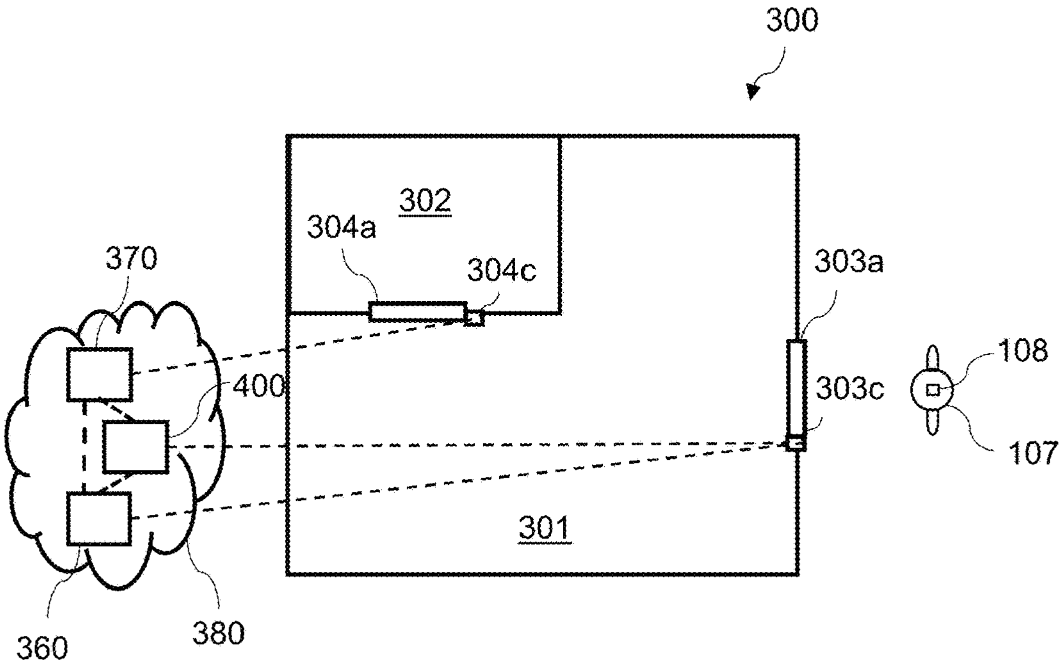
FIG. 5 schematically illustrates another access control system where a second restricted physical area is accessed through a first restricted physical area.

Another implementation is shown in FIG. 5. In this example, the first access control apparatus is a perimeter access control apparatus which can obtain a list of tokens from a subsidiary access control apparatus which are permitted to access the first area 301 of the building, and vice versa. In FIG. 5, the entities 360, 370 are entities located at a cloud server. The entities 360, 370 may alternatively be embodied by hardware. The entities 360, 370 are processing entities and comprise one or more memories. The entity 360 of the first access control apparatus comprises a first data store storing a first list of access tokens by which the first restricted physical area 301 can be accessed. The entity 370 of the second access control apparatus comprises a second data store storing a second list of access tokens by which the second restricted physical area 302 can be accessed. The data store at entity 370 also stores a third list of access tokens by which it is desired, for example by an operator or administrator of the second access control apparatus, to allow access to the area 301. This list can be compiled and/or amended by an operator or administrator of the second access control apparatus. The entities 360, 370 can communicate with each other and with the respective access control readers 303*c*, 304*c* of the access points they control via a data network such as the internet 380. The connection may be wireless, as in this case, or wired. In this example, the access control readers comprise the control unit for the access point.

The entity indicated at 400 comprises a third data store and is at a shared location accessible by both the first access control apparatus and the second access control apparatus. The second access control apparatus can write to the location 400 and the first access control apparatus can receive data written to the shared location 400. In this example, the entity 370 can write to the third data store at the location 400 and the entity 360 can receive data written to the third data store at the shared location 400. The entity 360 can grant permission to the entity 370 to write to the third data store at the shared location 400.

Generally, the second access control apparatus is responsive to an indication from the first access control apparatus of a location of the third data store to write the third list to the third data store at the location. In other words, the second access control apparatus can write the third list to the third data store at the location in response to an indication of the location of the third data store from the first access control apparatus. The first access control apparatus receives the third list from the third data store at entity 400. In the example shown in FIG. 5, the access control reader 303*c* of the first access control apparatus (which comprises the control unit for access point 303*a*) receives the third list from the third data store. In response to the presentation to the reader 303*c* of an access token, the control unit determines whether that access token is listed in the first list or the third list, and permits or denies access to the first restricted physical area 301 in response to that determination. If that access token is listed in the first list or the third list, access to the area 301 is permitted. If that access token is not listed in the first list or the third list, access to the area 301 is denied.

In this example, the entity 360 of the first access control apparatus informs the entity 370 of the second access control apparatus of the location of entity 400 where the entity 370 can write a list of users who are permitted to enter the area 301, and grants the entity 370 a permission to modify this list at the location. The shared location 400 may be controlled by the first access control apparatus (for example by entity 360).

In response to the indication of the location of the entity 400 from the entity 360 of the first access control apparatus, the entity 370 of the second access control apparatus can update the list at the entity 400 with the desired list of users to access the area 301.

The entity 360 is notified that this list has been modified, which then notifies the control unit for access point 303*a* (which in this example is at reader 303*c*), and the control unit then fetches the updated list from the shared location 400.

The shared location 400 may be in a cloud service. The location 400 may be remote from the first data store and the second data store where the first and second lists of tokens respectively are stored. In other examples, the shared location may be a location within the first data store.

Therefore, the first access control apparatus informs the second access control apparatus of a shared location where the second access control apparatus can write a list of users who are to be permitted to enter the first physical area (for example, according to the administrator of the second access control apparatus). The first access control apparatus may grant the second access control apparatus a permission to modify this list. The second access control apparatus may update a remote list at the shared location with the list of users permitted in the third list.

The reader or the control unit of the first access control apparatus can access the updated list from the shared location to grant access to the first restricted area. The first access control apparatus is notified that this list has been modified, which then notifies the control unit of the first access control apparatus, and the control unit can then fetches the updated list from the shared location. When a user presents their access token (which may be stored at a device 108) to the reader of the control unit for an access point controlled by the first access control apparatus, the user is granted access if their access token is in the first list or the third list.

In this case, the user 107 may be an employee of a company leasing the second area 302 of the building 300 and their access token is listed on the third list stored by the data store at entity 370. Because this list was written by the entity 370 of the second access control apparatus to the third data store at the shared location 400 and then communicated to the reader 303*c*, the access token presented by user 107 allows access to be granted to the user to the area 301.

The user 107 may then proceed through area 301 to access the second area 302. The user 107 can present their device 108 storing their access token to the reader 304*c* of access point 304*c*. Because that access token is on the second list stored at entity 370 of the second access control apparatus, access to the user is permitted to the area 302 via access point 304*a*.

Figure 6:
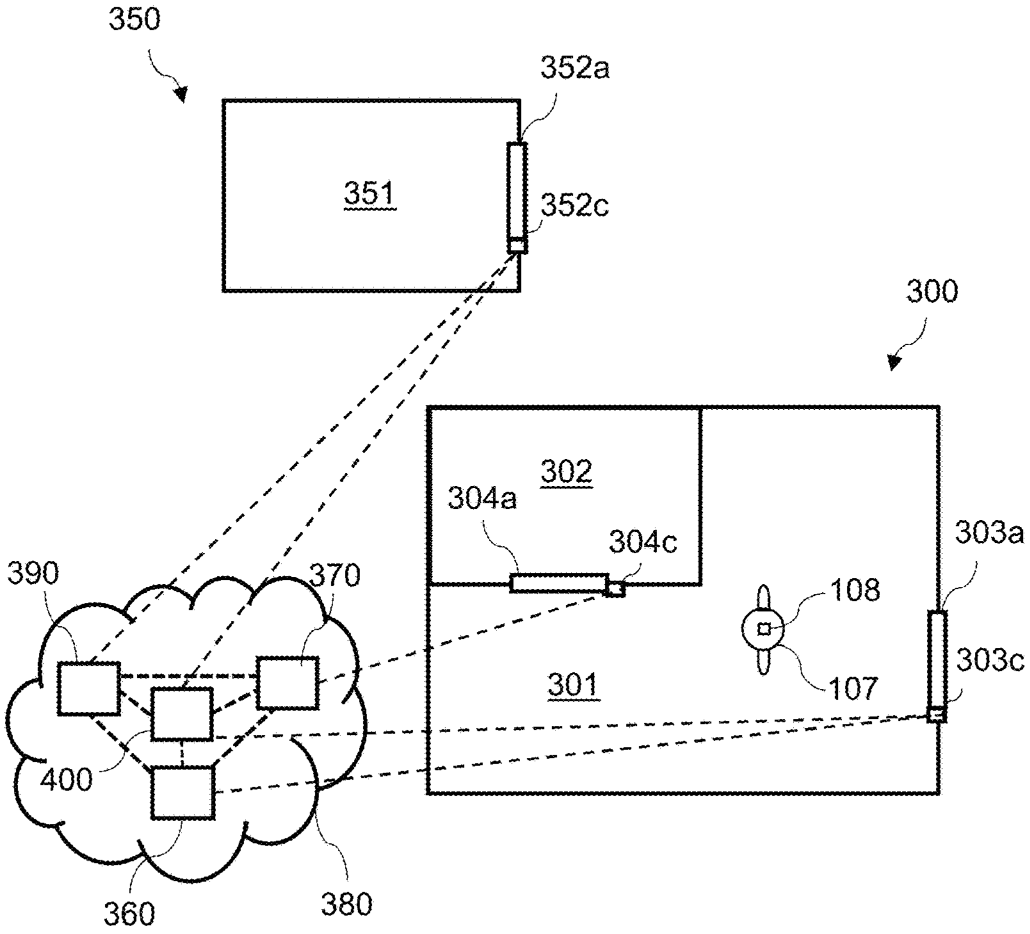
FIG. 6 schematically illustrates another access control system where first and second restricted physical areas are remote to each other.

As mentioned above, the entity 370 of the first access control apparatus may alternatively or additionally communicate with an entity 390 of a further access control apparatus, as shown in FIG. 6. In this example, the further access control apparatus comprising entity 390 controls access to the restricted area 351 in a separate building 350. The further access control apparatus comprises a data store (which in this example is at entity 390 in a cloud service) storing a local list of access tokens by which the area 351 can be accessed.

In this case, the entity 370 can communicate with the entity 390 to provide an indication of the shared location 400 and the entity 390 can write a list of access tokens that it desires to have access to area 302 to the data store at the location 400. The entity 390 can also send its local list of desired tokens to the other access control apparatus via the data store at location 400 so that the desired tokens can be authorized to have access to the communal area 301 and the area 302.

Alternatively, each pair of access control apparatus can communicate via a different shared location, rather than the common shared location 400.

Generally, the second list of access tokens by which the second restricted physical area can be accessed may be different to the third list of access tokens by which it is desired that the first restricted physical area can be accessed. The third list may be a sub-set of the second list. The third list may be a super-set of the second list. The third list and the second list may have one or more common elements. The second list may comprise one or more access tokens that the third list does not include. The administrator of the second access control apparatus might not wish to give all users of the second access control apparatus access to all areas of the first access control apparatus. The first access control apparatus may receive multiple different lists via the shared location (for example, users with 24-hour access, users with only 09:00-17:00 access, users who can access meeting rooms, etc) and only a subset of users/tokens in the second list of access token permitted to access the area controlled by the second access control apparatus may be put into these lists.

In general, the list of access tokens stored by the second access control apparatus restricting access to the second physical area does not need to be the same as the list of tokens shared by the second access control apparatus to the first access control apparatus via the third data store in order to restrict access to the first physical area. The locations of the remote list to be populated may be sent to a respective access control apparatus by the other access control apparatus. For example, where the first access control apparatus controls access to the building via the main door, the first access control apparatus may send an indication of the location of a blank list to the second access control apparatus, which may control access to a second restricted area (such as a tenanted area within the building), to be populated with a list of tokens requiring access to the first restricted area. For example, the first access control apparatus can invite the second access control apparatus to populate the list at the shared location with tokens which will be given access to the first restricted area controlled by the first access control apparatus, and/or the second access control apparatus may invite the first access control apparatus to populate a list at a shared location (which may be the same or a different location to the one used to share lists from the second apparatus to the first apparatus) to give access to a door controlled by the second access control apparatus. For example, a building operator can create a list and expose its location to a tenant organisation to be populated, or vice versa.

In the above examples, the control unit/reader of the first access control apparatus does not communicate directly with the second access control apparatus and instead can receive the third list from the third data store at the shared location.

The device 108 carried by the user 107 may store only one access token that can be used to gain access to both the first and area and the second area (any optionally any additional areas that the user is authorized to access).

An administrator of the second access control apparatus can therefore issue a device storing a token to a user and the token for that user can be added to the list of tokens to which access is granted at the first access control apparatus. This may be done without having to share that users name or token explicitly with the administrator of the other system.

In the implementations described herein, the lists of access tokens may not comprise information indicative of the identity of users corresponding to the respective access tokens in the respective list. This may allow access to be granted to particular users without sharing their personal information between the different parts of the system (i.e. between the first access control apparatus and the second access control apparatus).

As mentioned above, access to each area may be via an access point such as a security door, barrier or turnstile. Access to the first restricted area may be via one or more first access points. Access to the first restricted area may be via one or more second access points.

Each access point may have a control unit, such as control unit 110 mentioned above, which may be a part of the control reader for the access point.

Each first access point may have a control unit that is part of the first access control apparatus. Each second access point may have a control unit that is part of the second access control apparatus.

The first access control apparatus and the second access control apparatus may be configured to allow access to the first restricted physical area and the second restricted physical area in response to the same access token. This may allow the user to carry only one device storing their access token for both areas, which may be more convenient.

As mentioned above, in some examples, access to an area may be granted to an authorized user 24/7 (for example, security staff). Alternatively, restrictions can be placed on the times that a user is authorized to access the areas. For example, cleaners may be given access only in specific windows of time.

The local lists stored at each access control apparatus may include data indicating time restrictions for access to the restricted physical area by each access token in that local list. This information can be transmitted to the other access control apparatus when the local list is shared and can be maintained in the remote list at the other access control apparatus or sent to the other access control apparatus via the shared location.

The data indicating the time restrictions for tokens present in the local list at a particular access control apparatus may be configurable by an operator of that access control apparatus. This may allow the operator to set timing restrictions for access by the tokens in, for example, the second local list to the first restricted physical area. Alternatively, the time restrictions can be set by an operator of the other access control apparatus and the operator of that access control apparatus can decide which tokens are given access during those times.

For implementations where a third list of access tokens is shared via a third data store, for example at entity 400, the second data store of the second access control apparatus may store multiple third lists of access tokens by which it is desired that the first restricted physical area can be accessed. Each respective third list may comprise a different list of access tokens. Each third list may be associated with data indicating access time restrictions for tokens present in that respective third list. For example, a first third list may be associated with data indicating that the tokens in the first third list will be given 24/7 access to the first restricted physical area. A second third list may be associated with data indicating that the tokens in the second third list will be given 09:00-17:00 access to the first restricted physical area. This may allow access to the first area to be controlled differently for different groups of users. The data indicating the timing restrictions may be configurable by an operator of the first access control apparatus or the second access control apparatus.

As mentioned above, various arrangements of restricted physical areas are possible. One of the first restricted physical area and the second restricted physical area may be a sub-region of the other of the first restricted physical area and the second restricted physical area. The first restricted physical area and the second restricted physical area may be located in the same building. One of the first restricted physical and the second restricted physical area may be accessed through the other of the first restricted physical area and the second restricted physical area. One of the first restricted physical and the second restricted physical area may be located within the perimeter of the other of the first restricted physical area and the second restricted physical area. The areas may be rooms or zones within a large area.

In other examples, the first restricted physical area and the second restricted physical area may be remote from each other. The first restricted physical area and the second restricted physical area may be located in separate buildings.

Figure 7:
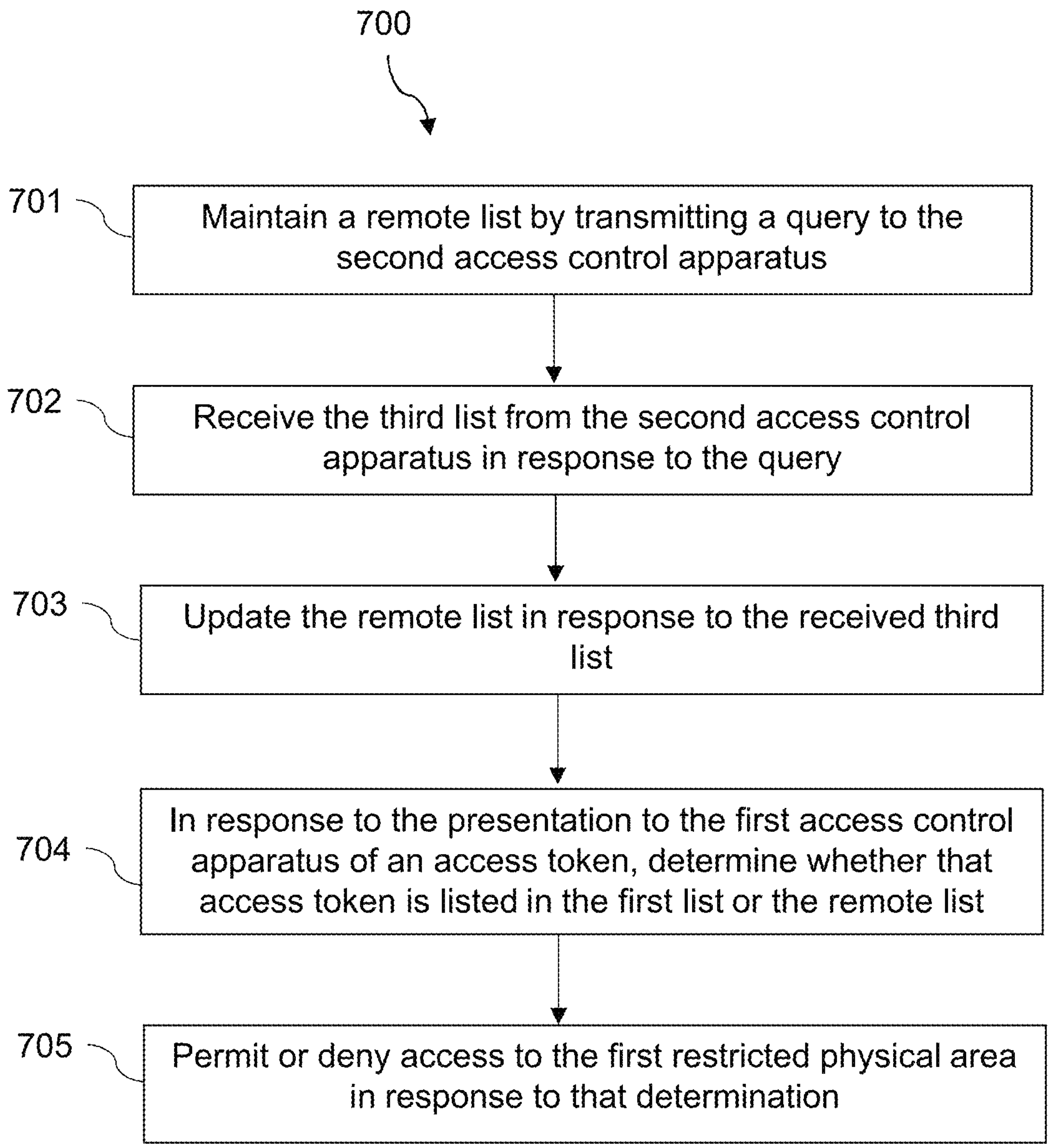
FIG. 7 shows a flowchart showing the steps of an exemplary method for implementation by an access control system comprising first and second access control apparatus.

FIG. 7 is a flowchart showing steps of an exemplary method that can be implemented by an access control system. As described above, the system comprises first and second access control apparatus. The first access control apparatus controls access to a first restricted physical area and comprises a first data store storing a first list of access tokens by which the first restricted physical area can be accessed. The second access control apparatus controls access to a second restricted physical area and comprises a second data store storing a second list of access tokens by which the second restricted physical area can be accessed and a third list of access tokens by which it is desired that the first restricted physical area can be accessed.

The second access control apparatus is responsive to a query authenticated as being from the first access control apparatus to transmit the third list to the first access control apparatus.

The first access control apparatus is operative to perform the method shown in FIG. 7. At step 701, the method comprises maintaining a remote list by transmitting a query to the second access control apparatus. At step 702, the method comprises receiving the third list from the second access control apparatus in response to the query. At step 703, the method comprises updating the remote list in response to the received third list. At step 704, in response to the presentation to the first access control apparatus of an access token, the method comprises determining whether that access token is listed in the first list or the remote list. At step 705, the method comprises permitting or denying access to the first restricted physical area in response to that determination.

Figure 8:
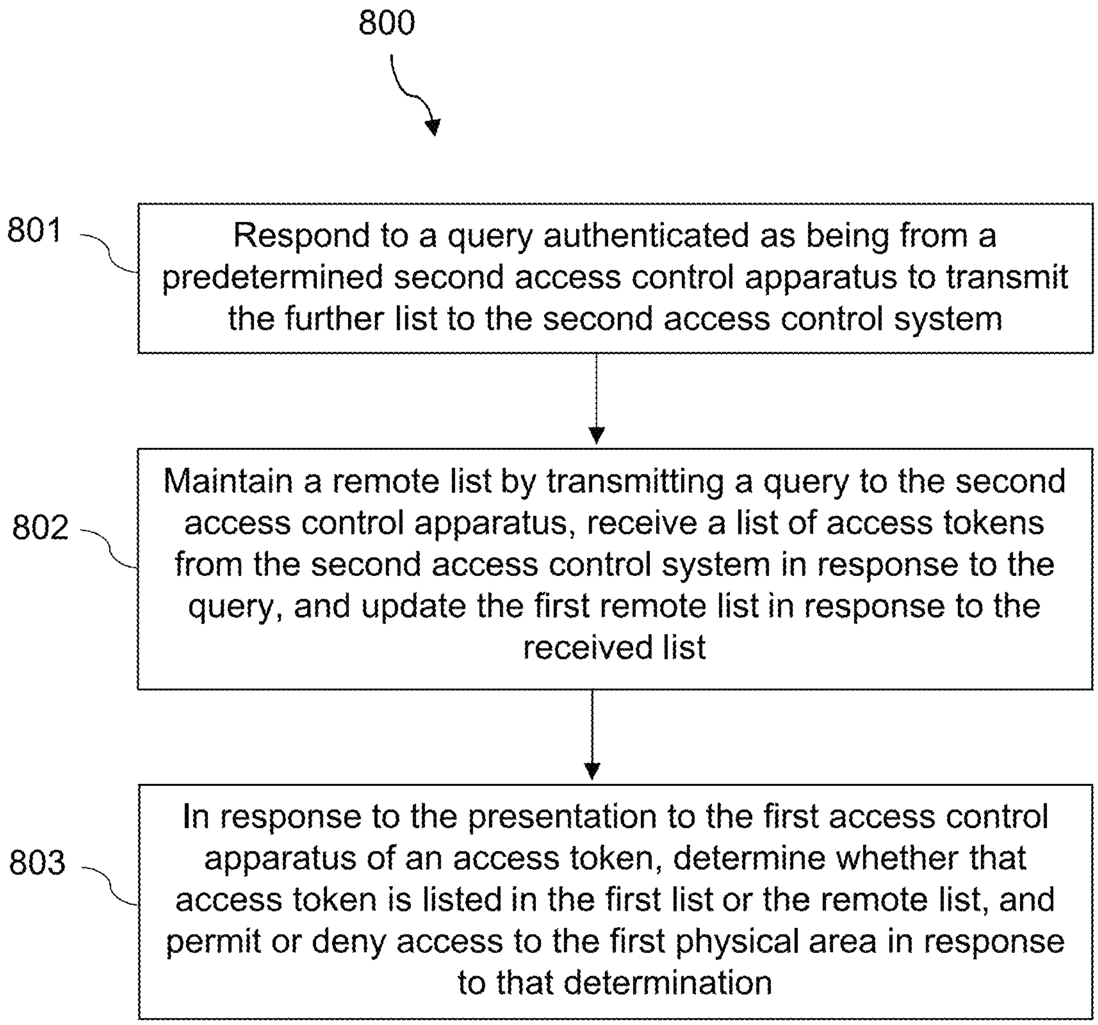
FIG. 8 shows a flowchart showing the steps of an exemplary method for implementation by an access control apparatus.

FIG. 8 shows the steps of an exemplary method performed by the first access control apparatus. The first access control apparatus comprises a data store storing a first list of access tokens by which the first restricted physical area can be accessed and a further list of access tokens by which it is desired that the second restricted physical area can be accessed. At step 801, the method comprises responding to a query authenticated as being from a predetermined second access control apparatus to transmit the further list to the second access control apparatus. At step 802, the method comprises maintaining a remote list by transmitting a query to the second access control apparatus, receiving a list of access tokens from the second access control apparatus in response to the query, and updating the remote list in response to the received list. At step 803, in response to the presentation to the first access control apparatus of an access token, the method comprises determining whether that access token is listed in the first list or the remote list, and permitting or denying access to the first physical area in response to that determination.

Figure 9:
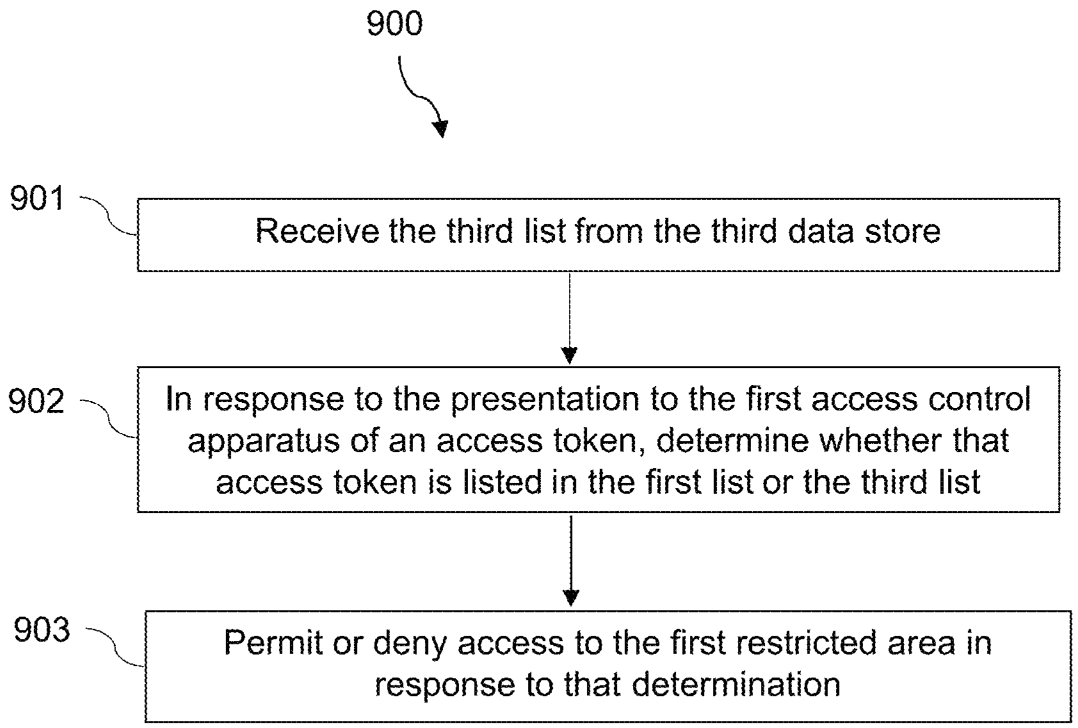
FIG. 9 shows a flowchart showing the steps of another exemplary method for implementation by an access control system comprising first and second access control apparatus.

FIG. 9 is a flowchart showing steps of an exemplary method that can be implemented by an access control system. As described above, the system comprises a first access control apparatus for controlling access to a first restricted physical area, the first access control apparatus comprising a first data store storing a first list of access tokens by which the first restricted physical area can be accessed; and a second access control apparatus for controlling access to a second restricted physical area, the second access control apparatus comprising a second data store storing a second list of access tokens by which the second restricted physical area can be accessed and a third list of access tokens by which it is desired that the first restricted physical area can be accessed. The second access control apparatus is responsive to an indication from the first access control apparatus of a location of a third data store to write the third list to the third data store. At the first access control apparatus, the method comprises, at step 901, receiving the third list from the third data store. At step 902, the method comprises, in response to the presentation to the first access control apparatus of an access token, determining whether that access token is listed in the first list or the third list. At step 903, the method comprises permitting or denying access to the first restricted physical area in response to that determination.

Figure 10:
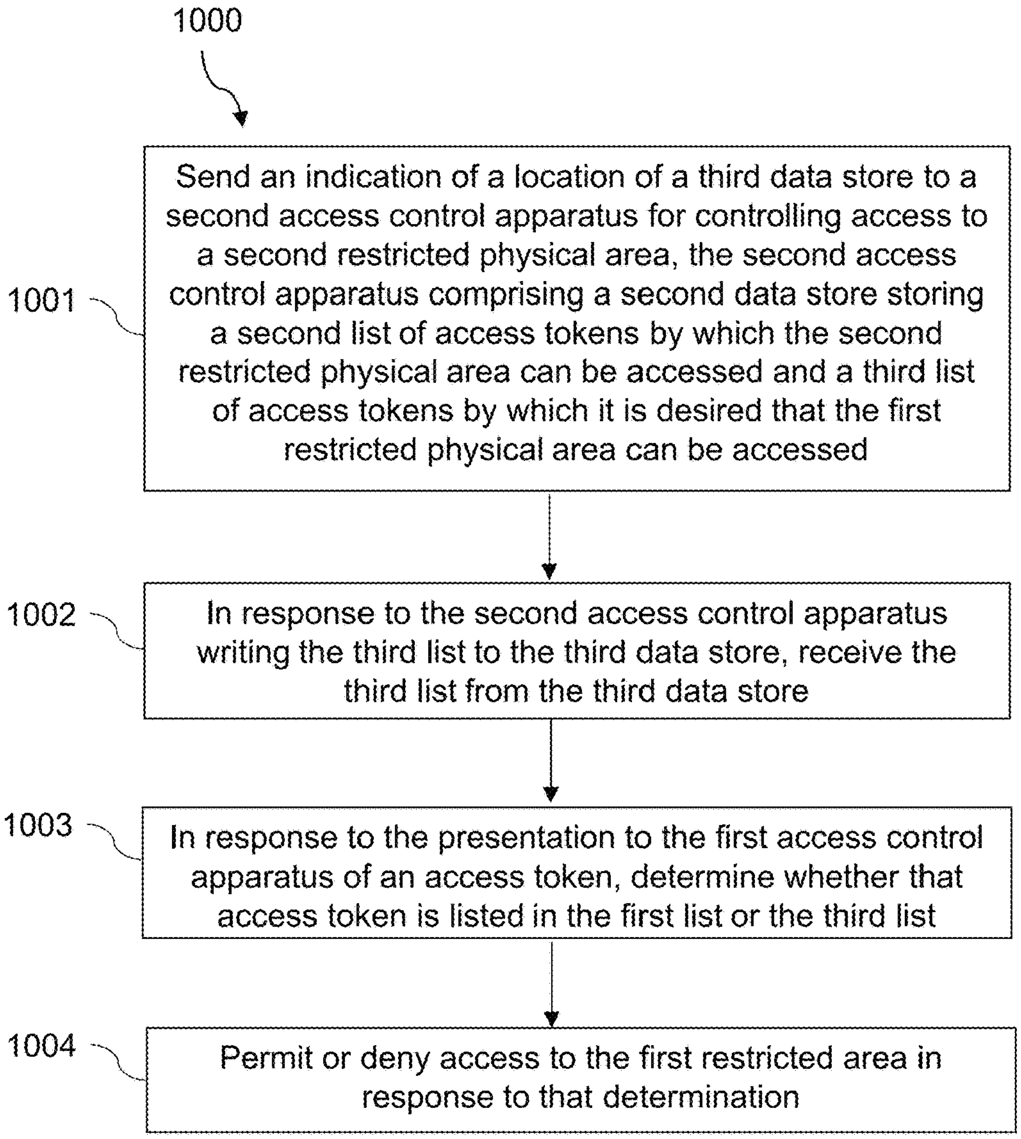
FIG. 10 shows a flowchart showing the steps of another exemplary method for implementation by an access control apparatus.

FIG. 10 shows the steps of an exemplary method performed by the first access control apparatus comprising a first data store storing a first list of access tokens by which the first physical area can be accessed. At step 1001, the method comprises sending an indication of a location of a third data store to a second access control apparatus for controlling access to a second restricted physical area, the second access control apparatus comprising a second data store storing a second list of access tokens by which the second restricted physical area can be accessed and a third list of access tokens by which it is desired that the first restricted physical area can be accessed. At step 1002, the method comprises, in response to the second access control apparatus writing the third list to the third data store, receiving the third list from the third data store. At step 1003, the method comprises, in response to the presentation to the first access control apparatus of an access token, determining whether that access token is listed in the first list or the third list. At step 1004, the method comprises permitting or denying access to the first physical area in response to that determination.

If access to the first restricted area is permitted, a signal can be sent to an access point for the first area to allow access. For example, a signal may be sent to the control unit of the access point to unlock a door. If access to the first restricted area is denied, other operations may be performed, such as logging an unauthorized access attempt to the first restricted area.

Figure 11:
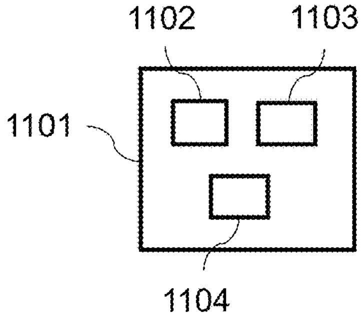
FIG. 11 shows an example of a computing device that may be used to implement the access control apparatus described herein and some of its associated components.

FIG. 11 shows an example of a device 1101 that may operate as an access control apparatus as described herein. The device 1101 comprises a processor 1102, a memory 1103 and a transceiver 1104. The processor of the apparatus may be implemented as a physical processing unit or could be a logical function that is distributed between multiple physical processing units. The apparatus may be located in the cloud, or at some other location. The access control apparatus may be distributed across multiple entities which may each perform any of the steps of the method above.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. The applicant indicates that aspects of the present invention may consist of any such individual feature or combination of features. In view of the foregoing description, it will be evident to a person skilled in the art that various modifications may be made within the scope of the invention.

The invention claimed is:

1. An access control system for controlling access to restricted physical areas, the access control system comprising: a first access control apparatus for controlling access to a first restricted physical area, the first access control apparatus comprising a first data store storing a first list of access tokens by which the first restricted physical area can be accessed; and a second access control apparatus for controlling access to a second restricted physical area, the second access control apparatus comprising a second data store storing a second list of access tokens by which the second restricted physical area can be accessed and a third list of access tokens by which it is desired that the first restricted physical area can be accessed; the second access control apparatus being responsive to an indication from the first access control apparatus of a location of a third data store to write the third list to the third data store; and the first access control apparatus being operative to: (i) receive the third list from the third data store; and (ii) in response to the presentation to the first access control apparatus of an access token, determine whether that access token is listed in the first list or the third list, and permit or deny access to the first restricted physical area in response to that determination.

2. The access control system as claimed in claim 1, wherein the first access control apparatus is configured to, in response to an indication from the third data store that the list at the third data store has been updated by the second access control apparatus, receive the updated list from the third data store.

3. The access control system as claimed in claim 1, wherein the second list is different from the third list.

4. The access control system as claimed in claim 3, wherein the tokens listed in the third list are a sub-set or a super-set of the access tokens in the second list.

5. The access control system as claimed in claim 1, wherein:

each access token of the first list and third list of access tokens corresponds to a respective user, each respective user being authorized to access the first restricted physical area; and/or each access token of the second list of access tokens corresponds to a respective user, each respective user being authorized to access the second restricted physical area.

6. The access control system as claimed in claim 1, wherein access to the first restricted physical area can be granted via one or more first access points and access to the second restricted physical area can be granted via one or more second access points.

7. The access control system as claimed in claim 6, wherein the first access control apparatus comprises a respective first control unit at the or each first access point and/or the second access control apparatus comprises a respective second control unit at the or each second access point.

8. The access control system as claimed in claim 6, wherein the first access control apparatus is operable to allow access to the first restricted physical area via a respective first access point when a device storing an access token in the first list or the third list is presented to an access control reader of the respective first access point.

9. The access control system as claimed in claim 8, wherein the device is configurable by an operator of the first access control apparatus or the second access control apparatus to store that access token.

10. The access control system as claimed in claim 1, wherein the first access control apparatus and the second access control apparatus are configured to allow access to the first restricted physical area and the second restricted physical area in response to the same access token.

11. The access control system as claimed in claim 1, wherein the third list is associated with data indicating time restrictions for access to the first restricted physical area by each access token in the third list.

12. The access control system as claimed in claim 1, wherein the second data store stores multiple third lists of access tokens by which it is desired that the first restricted physical area can be accessed, each respective third list comprising a different list of access tokens.

13. The access control system as claimed in claim 1, wherein one of the first restricted physical area and the second restricted physical area is a sub-region of the other of the first restricted physical area and the second restricted physical area.

14. The access control system as claimed in claim 1, wherein the first access control apparatus and the second access control apparatus are administered independently.

15. The access control system as claimed in claim 1, wherein the first restricted physical area and the second restricted physical area are located in the same building.

16. The access control system as claimed in claim 15, wherein one of the first restricted physical and the second restricted physical area is located within the perimeter of the other of the first restricted physical area and the second restricted physical area.

17. The access control system as claimed in claim 1, wherein the first restricted physical area and the second restricted physical area are remote from each other.

18. The access control system as claimed in claim 17, wherein the first restricted physical area and the second restricted physical area are located in separate buildings.

19. A method for implementation at an access control system, the access control system comprising a first access control apparatus for controlling access to a first restricted physical area, the first access control apparatus comprising a first data store storing a first list of access tokens by which the first restricted physical area can be accessed; and a second access control apparatus for controlling access to a second restricted physical area, the second access control apparatus comprising a second data store storing a second list of access tokens by which the second restricted physical area can be accessed and a third list of access tokens by which it is desired that the first restricted physical area can be accessed; the second access control apparatus being responsive to an indication from the first access control apparatus of a location of a third data store to write the third list to the third data store; the method comprising, at the first access control apparatus:

(i) receiving the third list from the third data store; and (ii) in response to the presentation to the first access control apparatus of an access token, determining whether that access token is listed in the first list or the third list, and permit or deny access to the first restricted physical area in response to that determination.

20. An access control apparatus for controlling access to a first restricted physical area, the access control apparatus comprising:

a first data store storing a first list of access tokens by which the first physical area can be accessed; and one or more processors configured to:

(i) send an indication of a location of a third data store to a second access control apparatus for controlling access to a second restricted physical area, the second access control apparatus comprising a second data store storing a second list of access tokens by which the second restricted physical area can be accessed and a third list of access tokens by which it is desired that the first restricted physical area can be accessed;

(ii) in response to the second access control apparatus writing the third list to the third data store, receive the third list from the third data store; and (iii) in response to the presentation to the first access control apparatus of an access token, determine whether that access token is listed in the first list or the third list, and permit or deny access to the first physical area in response to that determination.

* * * * *